(12) United States Patent
Guthery

(10) Patent No.: US 6,567,915 B1
(45) Date of Patent: May 20, 2003

(54) INTEGRATED CIRCUIT CARD WITH IDENTITY AUTHENTICATION TABLE AND AUTHORIZATION TABLES DEFINING ACCESS RIGHTS BASED ON BOOLEAN EXPRESSIONS OF AUTHENTICATED IDENTITIES

(75) Inventor: Scott B. Guthery, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/178,228

(22) Filed: Oct. 23, 1998

(51) Int. Cl.$^7$ .............. H04L 9/00; H04K 1/00; G06F 17/60

(52) U.S. Cl. .......... 713/168; 713/160; 713/161; 713/169; 713/170; 713/171; 713/172; 713/175; 713/176; 713/185; 705/17; 705/18; 705/65; 705/67; 705/44; 705/41

(58) Field of Search ................ 713/160, 161, 713/170–172, 175–176, 168–169, 185; 705/65, 67, 41, 44, 17–18

(56) References Cited

U.S. PATENT DOCUMENTS

| | | | | |
|---|---|---|---|---|
| 4,709,137 A | * | 11/1987 | Yoshida | 235/379 |
| 4,734,568 A | * | 3/1988 | Watanable | 235/487 |
| 4,742,215 A | * | 5/1988 | Daughters et al. | 235/487 |
| 4,804,825 A | * | 2/1989 | Bitoh | 235/380 |
| 4,831,245 A | * | 5/1989 | Ogasawara | 235/492 |
| 4,897,875 A | * | 1/1990 | Pollard et al. | 380/21 |
| 4,960,982 A | * | 10/1990 | Takahira | 235/382 |
| 4,961,142 A | * | 10/1990 | Elliot et al. | 705/73 |
| 4,985,920 A | * | 1/1991 | Seki | 713/193 |
| 5,048,085 A | * | 9/1991 | Abraham et al. | 713/159 |
| 5,339,400 A | * | 8/1994 | Iijima | 395/425 |
| 5,548,649 A | * | 8/1996 | Jacobson | 380/49 |
| 5,563,878 A | * | 10/1996 | Blakeley et al. | 370/60 |
| 5,642,401 A | * | 6/1997 | Yahagi | 379/58 |
| 5,708,715 A | * | 1/1998 | Vicard | 380/25 |
| 5,721,781 A | * | 2/1998 | Deo et al. | 380/25 |
| 5,845,069 A | * | 12/1998 | Tanaka | 705/18 |
| 5,892,902 A | * | 4/1999 | Clark | 395/187.01 |
| 5,914,471 A | * | 6/1999 | Van De Pavert | 235/380 |
| 6,035,402 A | * | 3/2000 | Vaeth et al. | 713/201 |
| 6,049,838 A | * | 4/2000 | Miller et al. | 709/303 |
| 6,014,558 A | * | 6/2000 | Thomas | 455/410 |
| 6,076,164 A | * | 6/2000 | Tanaka et al. | 713/185 |
| 6,098,891 A | * | 8/2000 | Guthery et al. | 235/492 |
| 6,182,215 B1 | * | 6/2001 | Tatebayashi et al. | 713/168 |

OTHER PUBLICATIONS

Bruce Schneier, applied cryptography 1996, Katherine Schowalter, second edition, 566–571.*

* cited by examiner

Primary Examiner—Thomas R. Peeso
Assistant Examiner—Kambiz Zand
(74) Attorney, Agent, or Firm—Lee & Hayes, PLLC

(57) ABSTRACT

This invention concerns an integrated circuit (IC) device, such as smart cards, electronic wallets, PC cards, and the like, and various methods for authenticating identities and authorizing transactions based on the authenticated identities. The IC device has a memory and a processor. The IC device maintains an identity authentication table in the memory to hold an arbitrary number of identities. The identity authentication table correlates identities with authentication protocols, so that different protocols can be used to authenticate associated identities. The identity authentication table also correlates counts with the identities. Individual counts specify a number of uses of the IC device for a corresponding identity without requiring the IC device to authenticate the identity for each use. The IC device also maintains an authentication vector in memory. The authentication vector tracks identities in the identity authentication table that are currently authenticated by the IC device. The IC device further maintains authorization tables in the memory and in association with particular files used in transactions. Each authorization table defines authorization for a particular transaction as a Boolean expression of the identities listed in the identity authentication table.

53 Claims, 6 Drawing Sheets

| | Identity | Protocol | Data | Authentication Count |
|---|---|---|---|---|
| 98 | Holder | PIN | Passcode No. | 5 |
| 100 | Video Store | Cert. Exchange | Certificate | 0 |
| 102 | Bank | Cert./Signature Exchange | Certificate/ Bk. Pub.Key | 0 |
| 104 | Grocery Store | Cert. Exchange | Certificate | 0 |

| | Transaction | Authorization Expression |
|---|---|---|
| 124 | Rent Movie | (Holder AND Video Store) OR (Holder AND Grocery Store) |
| 126 | Return Movie | Video Store OR Grocery Store |

INTEGRATED CIRCUIT CARD WITH IDENTITY AUTHENTICATION TABLE AND AUTHORIZATION TABLES DEFINING ACCESS RIGHTS BASED ON BOOLEAN EXPRESSIONS OF AUTHENTICATED IDENTITIES

TECHNICAL FIELD

This invention relates to integrated circuit (IC) cards, such as smart cards, and methods for using IC cards for authentication purposes. This invention may also be extended to other types of IC devices with limited memory and processing capabilities, such as smart diskettes, electronic wallets, PC cards, and the like. More particularly, the invention relates to methods for using Boolean functions of authenticated entities to enable use of the IC device, as well as persistent storage tables to track limited multi-transactional authentication.

BACKGROUND OF THE INVENTION

Authentication systems are used for security purposes to verify the authenticity of one or more parties or entities during a transaction. Traditionally, authentication systems have been manual, involving personal recognition or quick verification of a party via some form of additional identification. One very familiar authentication process occurs when purchasing an item with a personal check. The sales clerk will process the check only if he/she recognizes the person writing the check or if the person presents another piece of identification (e.g., a credit card or driver's license) to verify their authenticity as the specific person who is tendering the check.

Today, many authentication systems are electronic. A familiar electronic authentication system is a common credit card purchase. A card issuer issues a credit card to a consumer to enable the consumer to purchase items on credit. Credit cards that are primarily in use today consist of magnetic-stripe memory cards that have a single magnetic stripe ("mag-stripe") on one side. The magnetic stripe contains information about the card issuer, the consumer, and his/her account.

During a purchase transaction, the consumer presents the credit card to a sales clerk, who authenticates the card before finalizing the transaction. The credit card authentication process is typically performed "online". The sales clerk swipes the card through a reader, which extracts the card data from the magnetic stripe and transmits the data over a network to the card issuer (or a third party contracted to handle authentication requests). The card issuer checks to ensure that the card is still valid (i.e., has not expired), has not been revoked as being lost or stolen, and the corresponding account is below the authorized credit limit. If the authentication is successful, the card issuer returns an approval and the sales clerk completes the transaction. With conventional telecommunications and computerized processes, the entire credit card authentication process is typically handled in an acceptable length of time, such as a few seconds.

Today, there is increasing use of "smart cards" in place of, or in addition to, conventional magnetic stripe cards. A "smart card" is a thin card about the size of a credit card, with a built-in processor that enables the card to modify, or even create, data in response to external stimuli. The processor is a single-wafer integrated circuit (IC) which is mounted on an otherwise plastic card. For this reason, smart cards are often referred to as one class of "integrated circuit cards" or "IC cards".

As smart card technology becomes more pervasive, it paves the way for conducting a variety of new transactions, such as electronic money, which are not available with conventional mag-stripe cards. Smart cards also open up the arena for conducting certain new "offline" transactions, which do not involve validating a card with a central authority. These offline electronic transactions are typically performed without the human intervention, such as from a sales clerk.

Smart cards are equipped with authentication capabilities used to establish the identity of an entity with which it is communicating. An identity can be an individual human being, a business, a piece of computing hardware, software code, a network node, an organizational role, or an accreditation agent. Smart cards also have authorization capabilities to control access to resources stored on the cards or elsewhere.

Typically, smart cards recognize a small, fixed number of generic authenticatable identities, typically only two or three. While a card may provide different ways to authenticate these generic identities, the access privileges granted to an authenticated identity do not depend directly on which method was used to perform the authentication. Smart cards have resorted to this collapsing of identities on the grounds of saving space and in the era of single-use, purpose-built cards this optimization caused little trouble.

Reusing or "aliasing" a fixed number of generic identities across different datasets has a number of shortcomings in the era of multi-use and multi-application cards. First, all data needed by a particular identity must be organized in a way that does not trigger changes in authentications or authorizations as it is used. This, in turn, means that data access privileges become implicitly intertwined with data location and layout; changing the location of a file may change who can access the file and, if it is a key file, who can access other files. Secondly, data access policies that involve more than the number of generic identities supported by the card simply cannot be expressed.

Accordingly, it is desirable to design a smart card that can track an arbitrary number of identities and that makes data access policies independent data file location.

Identities authenticated to today's smart cards only persist for the duration of the session in which they are established. As a result, all identities that authorize a transaction or access to data on the card must authenticate themselves to the card each time it is used. This need to concurrently locate in time all the parties that must either approve or witness a card interaction severely limits the scope of applicability of the data and computational security provided by smart cards.

Accordingly, there is a need for improving smart cards to allow multiple uses of a card without requiring repeated authentication of an identity.

Apart from issues facing smart cards, another area of concern for facilitating a secure environment is the use of protected resources. One solution is to use capabilities to grant or deny access to the resources. A "capability" is like a ticket that lets you do a particular thing. A key is a familiar example of a capability. Its possession is necessary and sufficient to gain access to what it protects. Neither the key nor the lock know who is using it and the lock doesn't maintain a list of all keys that can open it.

In a computer system, a capability ticket might permit someone to read a particular file. A ticket is presented to the file system, which validates the ticket and lets the ticket presenter read the file. Operating systems have been constructed using capabilities rather than access control lists to control access to their resources. Despite their usefulness in attacking the problems of access control lists, capabilities have not become popular for a number of reasons, including the difficulty of securely creating capability tickets.

Accordingly, there is a need for a system to securely create capabilities.

SUMMARY OF THE INVENTION

This invention concerns an integrated circuit (IC) device, such as smart cards, electronic wallets, PC cards, and the like, and various methods for authenticating identities and authorizing transactions based on the authenticated identities.

The IC device has a memory and a processor. The IC device maintains an identity authentication table in the memory to hold an arbitrary number of identities. The identity authentication table correlates identities with authentication protocols, so that different protocols can be used to authenticate associated identities. The identity authentication table also correlates counts with the identities. Individual counts specify a number of uses that the IC device can assume a corresponding identity has been authenticated so that without requiring the IC device to authenticate the identity for each use.

The IC device also maintains an authentication vector in memory. The authentication vector tracks identities in the identity authentication table that are currently authenticated by the IC device.

The IC device further maintains authorization tables in the memory and in association with particular files used in transactions. Each authorization table defines authorization for a particular transaction as a Boolean expression of the identities listed in the identity authentication table.

When the IC device receives an identity, it first looks to see if the identity is listed in the identity authentication table. If so, the IC device uses the corresponding protocol to authenticate the identity. If authentication proves successful, the IC device indicates in the authentication vector that this identity is currently authenticated.

When the IC device receives a request for a particular transaction, the IC device evaluates what identities need to be authenticated to satisfy the Boolean expression and gain authorization to perform the particular transaction using the authorization table. The IC device checks the authentication vector to determine if the identities needed to satisfy the Boolean expression are currently authenticated, and if so, authorizes the transaction.

The count field in the identity authentication table allows the IC device to support "persistent" authentication. If the count is nonzero (or some other threshold value), the IC device can assume, for purposes of determining authorization, that the identity has been authenticated and need not require receipt of the identity at this time. After each transaction involving the identity, the count is decremented.

The IC device is also configured to perform single command transactions. An instantaneous authentication command containing an operation and an identity are passed to the IC device. The device authenticates the identity using the protocol specified in the identity authentication table and is successful, performs the operation. Immediately thereafter, the IC device deauthenticates the identity so that only the single operation is performed.

DETAILED DESCRIPTION

The following discussion assumes that the reader is familiar with cryptography. For a basic introduction of cryptography, the reader is directed to a text written by Bruce Schneier and entitled "Applied Cryptography: Protocols, Algorithms, and Source Code in C," published by John Wiley & Sons with copyright 1994 (second edition 1996), which is hereby incorporated by reference.

Figure 1:
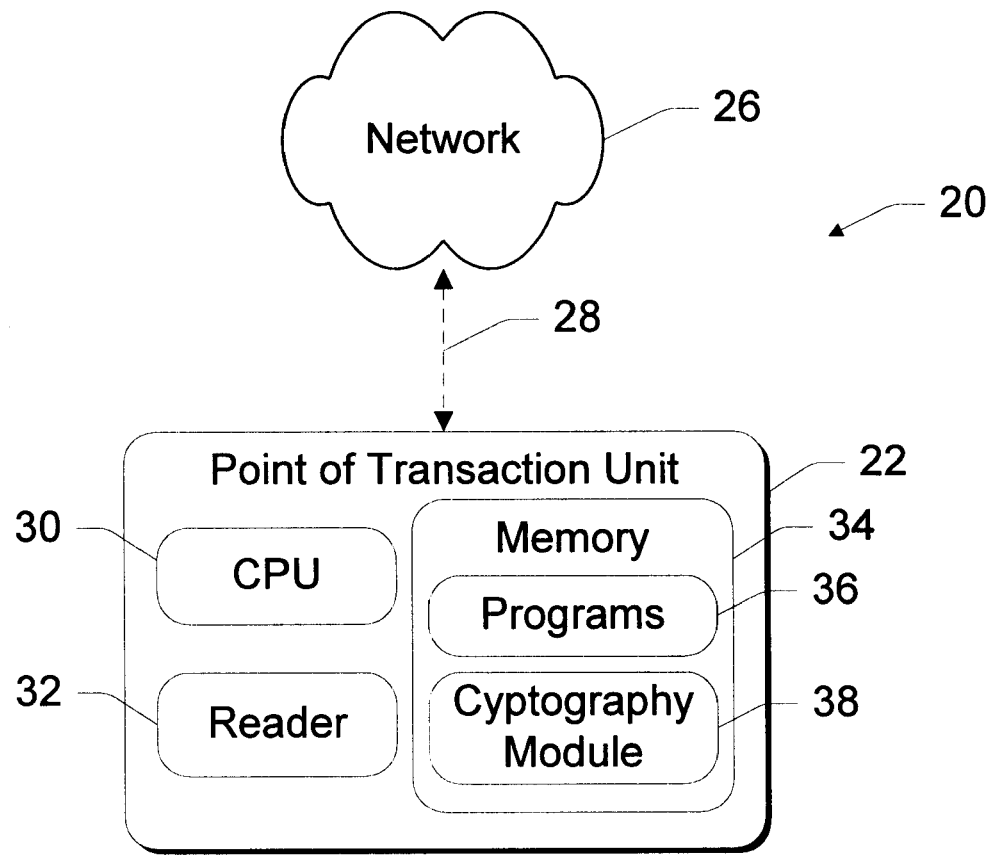
FIG. 1 is a block diagram of a point-of-transaction system used to authenticate an IC device.

FIG. 1 shows a system 20 having a point-of-transaction unit 22 and a multi-purpose integrated circuit (IC) device 24. The point-of-transaction unit 22 may be a standalone device, in which the IC device is called upon to perform offline verification. Alternatively, the point-of-transaction unit 22 may be connected to a network 26 via a cable or wireless connection represented by dashed line 28 to enable online verification or to facilitate authorization procedures initiated by the IC device. The network 26 can be a data communications network including a wire-based network, such as an enterprise network (e.g., a local area network for a business) or a public network (e.g., the Internet), and a wireless network (e.g., satellite network). The network 26 can also be implemented as a telephone network, or an interactive television network, or any other form for linking the point-of-transaction unit 22 to an external source of information.

The point-of-transaction unit 22 has a central processing unit (CPU) 30, a reader 32 to interface with the IC device 24, and memory 34. Programs 36 and a cryptography module 38 are stored in memory 34 for execution on the CPU 30.

The point-of-transaction unit 22 is representative of many different types of computerized devices that are provided for interaction with users. The point-of-transaction unit 22 may take the form of a general-purpose computer, an ATM (automated teller machine), a kiosk, a vending machine, an automated entry gate, an electronic ticket apparatus, a set top box, and the like. The point-of-transaction unit 22 controls the information transfer to and from the IC device 24.

Depending upon the configuration and operating environment of the point-of-transaction unit 22, one or more software applications 36 may execute on the unit. A user's home or work computer typically executes many different applications. Conversely, a computer implemented as a kiosk, ATM, or vending machine might only execute one specific application.

The IC device 24 is illustrated as a multi-purpose smart card or IC card. The multi-purpose smart card contains various resources that might be used by, or in support of, an application executing on the point-of-transaction unit 22. Among these resources are cryptography capabilities. The IC card stores public and private key pairs and can hold related data such as certificates. The IC card also performs rudimentary cryptographic functions, including encryption, decryption, signing, authentication. The IC card may also contain resources in the form of electronic assets, which represent value. For instance, the IC card might store assets in the form of electronic entertainment tickets, travel reservations, service contracts, medical prescriptions, government entitlement provisions, electronic cash, public transportation tokens, and so one. With such diverse resources, the IC card 24 is capable of supporting multiple applications in different environments.

One exemplary implementation of an architecture that facilitates multi-use IC cards is described in co-pending U.S. patent application Ser. No. 08/647,199, entitled "System And Method For Configuring And Managing Resources On A Multi-Purpose Integrated Circuit Card Using A Personal Computer", which was filed Mar. 11, 1996 in the names of Doug Barlow, Blair Dillaway, Barbara Fox, Terry Lipscomb, and Terrence Spies. This application is assigned to Microsoft Corporation and is hereby incorporated by reference.

It is noted that, in addition to the illustrated smart cards, the IC device might be embodied in other forms, such as an electronic wallet, a personal digital assistant, a smart diskette (i.e., an IC-based device having a form factor and memory drive interface to enable insertion into a floppy disk drive), a PC card (formerly PCMCIA card), and the like. Generally, the IC device 24 is characterized as an electronic device with limited processing capabilities and memory wherein large size number crunching is impractical. However, aspects of this invention may be utilized with IC devices that do not meet this limitation, as well as to verification of non-computerized items, such as conventional credit cards. For purposes of continuing discussion and within the context of the illustrated implementation, the terms "IC device", "IC card", and "smart card" will be used interchangeably to reference the IC device 24.

The system 20 implements software that enables authentication of the point-of-transaction unit 22, the IC card 24, and any application running on the unit 22 and IC card 24. In addition, the system software enables authentication of the user to the IC card 24.

In one exemplary implementation, the system software includes a software application interface which executes on the point-of-transaction unit 22 to prevent possible covert attacks from malicious software applications which attempt to gain unauthorized access to resources on the IC card. The application interface implements the application and provides services which facilitate access to the resources on the IC card 24, without allowing the application itself to directly access the card-based resources. The application interface is implemented as a service layer for the operating system and is securely integrated with the operating system through mutual authentication.

During initialization, the application interface and the operating system exchange certificates containing identifications (i.e., serial numbers or the like) which are signed by a trusted certifying authority (e.g., the manufacturer). The operating system and application interface then authenticate each other using the certificates. One technique for authenticating the various components in a computer system, as well as the user, is described in U.S. Pat. No. 5,721,781, entitled "Authentication System and Method for Smart Card Transactions", which issued Feb. 24, 1998 in the name of Vinay Deo, Robert B Seidensticker, and Daniel R. Simon. This patent is assigned to Microsoft Corporation and is hereby incorporated by reference.

The application interface is preferably an application program interface with a set of functional APIs that can be called by the application to support a particular functionality requested by the application. One exemplary set of APIs are described in the above incorporated U.S. patent application Ser. No. 08/647,199.

Exemplary IC Device Implementation

Figure 2:
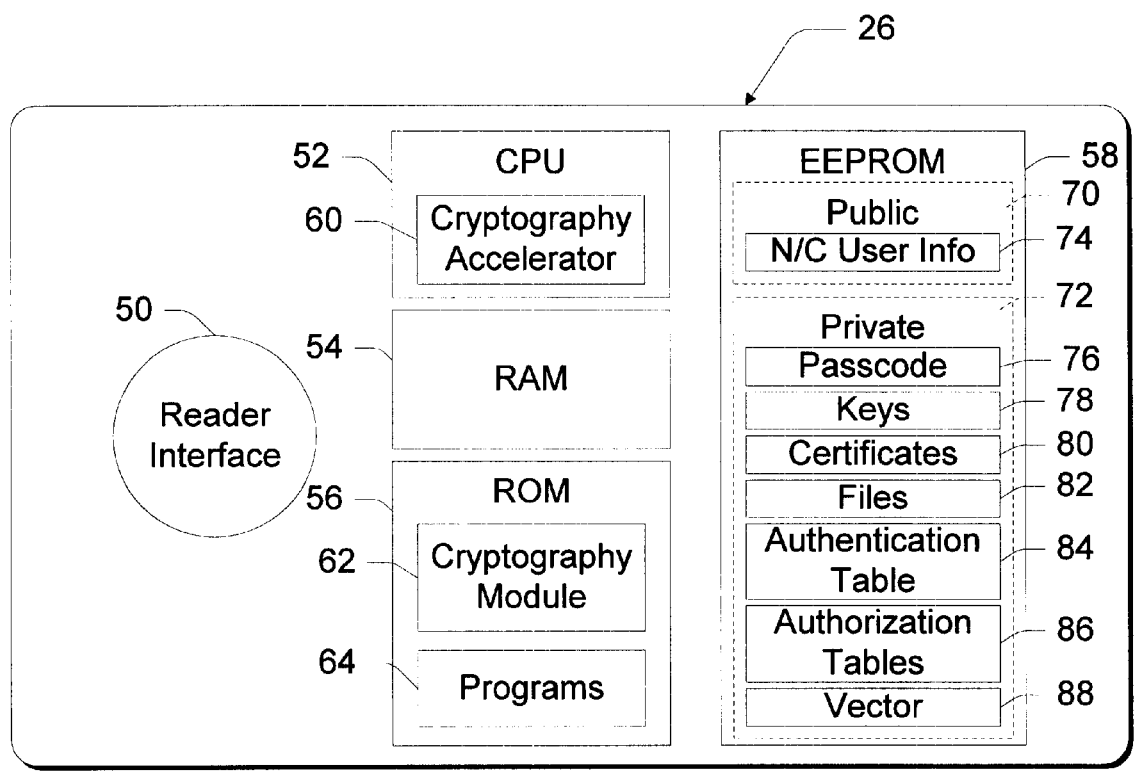
FIG. 2 is a block diagram of an IC device embodied as a smart card.

FIG. 2 shows an exemplary smart card implementation of the IC device 24. The smart card has a reader interface 50 for coupling to a card reader, a CPU or processor 52, a volatile rewritable RAM (Random Access Memory) 54, a ROM (Read Only Memory) 56, and an persistent reader/write memory such as EEPROM (Electrically Erasable Programmable ROM) 58. A multi-bit bus (not shown) connects the components.

The smart card 24 is configured with cryptography acceleration circuitry 60, shown integrated with the CPU 52, which streamlines cryptography computations to improve speed. The cryptography accelerator 60 can alternatively be implemented independently of the CPU.

The ROM 56 stores a cryptographic program 62 that executes on the CPU 52 in conjunction with the cryptography accelerator 60 to perform certain cryptographic functions, including encryption, decryption, signing, and verification. As an example, the cryptographic program 62 can encrypt and decrypt short messages using asymmetric key cryptography, such as RSA, and symmetric key cryptography, such as DES (Data Encryption Standard). The cryptographic program 62 might also be capable of generating and destroying cryptographic keys, such as symmetric keys used in the bulk encryption/decryption of a message. The symmetric keys are typically "sessional," meaning they are generated for each transaction and then subsequently destroyed.

One or more programs 64 are also stored in ROM 56. These programs are run on the CPU 52 to facilitate sessions with corresponding programs on the point-of-transaction unit 22.

The EEPROM 58 is partitioned into a public storage 70 and a private storage 72. The public storage 70 contains non-confidential user information 74, such as medical data or driver's license information. This information can be distributed freely by the smart card 24, without any special security protocol or the need for the user to enter a personal passcode.

The private storage 72 maintains information to which the user wishes to control access. The processor 52 only retrieves information from the private storage 72 upon authentication by the user and/or other entities. One technique for authenticating the user is to require the user to enter a passcode into the point-of-transaction unit 22. The passcode is passed through the card reader 32 (see, e.g., FIG. 1) to the card I/O port 50, and to the card CPU 52. The CPU 52 compares the entered passcode to a passcode 76 stored in EEPROM 56, and authenticates the user if the entered and stored passcodes match.

The private storage 72 of EEPROM 58 stores cryptographic keys 78 to facilitate authentication and secure data exchange. As one example, the smart card might store two asymmetric pairs of public and private cryptography keys—a signing pair and a data exchange pair. One or more certificates 80 are also stored in the private storage 72. These certificates might contain a card ID, or user ID, public keys, and a signature of a certifying authority. One certificate might be used in a number of different applications, or alternatively, for only a specific corresponding application.

The IC card is designed to avdoid exposing the private keys. The encryption keys are never directly accessible and the asymmetric private signing and exchange keys are not permitted to leave the IC card under any circumstances. In this manner, the IC card prevents a foreign application from ever inadvertently or intentionally mishandling the keys in a way that might cause them to be intercepted and compromised.

Files 82 are also stored in the private segment 72 of the EEPROM 58. These files contain data that is used by the programs during transactions. For instance, the files 82 might represent electronic assets such as tickets, tokens, e-cash, government entitlements, or a pointer to a source of value. The files might alternatively hold travel bonus awards such as air miles or hotel stays, or frequent purchase plans such as video rental or gas purchase. The files might further hold medical prescriptions and reservations.

The private segment 72 of EEPROM 58 also holds an authentication table 84, one or more authorization tables 86, and an authentication vector 88. The authentication table 84 holds a list of authenticatable identities, such as people, entities, agencies, code, hardware, and so on. The authorization tables 86 determine authorization as a Boolean expression of authenticatable identities listed in the authentication table 84. The authorization tables 86 are associated with the files 82. The authentication vector 88 lists the identities that are currently authenticated by the card.

Identity Authentication Table

The multi-purpose smart card 24 can be used in many different ways and for many diverse environments. The smart card 24 might be used to rent a movie in one case and to withdraw money from a bank in another case. The same card might then be used to purchase groceries or to redeem flight miles.

In each environment, the smart card 24 performs various authentication procedures to verify the authenticity of the participating identity or identities. The authentication procedures may be performed using conventional techniques. For instance, the smart card might verify the user by requesting a PIN and comparing the PIN entered by the user with the passcode 76. The smart card might authenticate a grocery store or a bank by exchanging certificates and/or public keys.

The smart card 24 is designed to keep track of an arbitrary number of identities (limited only by the resources of the card). Identities do not have to be aliased or reused and data access policies can expressed directly in terms of these identities and are independent of other features of the card, such as data location.

Figures 3, 4, 5:
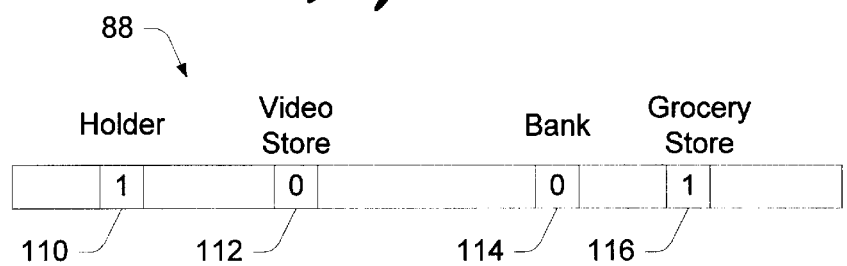
FIG. 3 illustrates, an identity authentication table maintained in the IC device.
FIG. 4 illustrates an authentication vector maintained in the IC device.
FIG. 5 illustrates an authorization table maintained in the IC device.

FIG. 3 shows an identity authentication table 84 that lists the identities and correlates with them information describing how particular identities are authenticated. More particularly, the authentication table 84 has an identity field 90, a protocol field 92 for storing information describing how the identity is to be authenticated, and a data field 94 to hold the data required by the authentication protocol. The authentication table 84 also has a count field 96, which tracks the number of transactions or uses that an identity may be considered as authenticated without requiring re-authentication using the authentication protocol.

The authentication table 84 holds one or more identities, depending upon the number of uses for the smart card. Identities may be added to and removed from the card by simply altering this table.

For example, suppose the smart card 24 (see, e.g., FIGS. 1 and 2) is configured to engage in bank transactions (e.g., withdraw, transfer, etc.), purchase groceries, and rent movies. The authentication table 84 holds four identities: a card holder 98, a video store 100, a bank 102, and a grocery store 104. The IC card 24 authenticates the card holder 98 using a PIN protocol in which the holder enters his/her passcode number. The IC card 24 authenticates the bank using a signed certificate exchange. This involves verifying the bank's certificate using the bank's public signing key. The IC card 24 authenticates the video store and grocery store by simply examining certificates passed in by these entities. A certifying authority, which can be verified by the card, signs the certificates and the card makes a judgement whether to trust the certificates passed in by the video store and grocery store. These authentication practices are common and used for example purposes. Other authentication procedures may be used.

Authentication Vector

The smart card 24 (see, e.g., FIGS. 1 and 2) maintains an authentication vector 88 in EEPROM 58. The authentication vector 88 tracks which identities are currently authenticated by the card at any given time.

FIG. 4 shows an authentication vector 88 implemented as a bit array. The vector 88 has one or more bits assigned or associated with various identities that may be authenticated by the card. Continuing with the example identities of FIG. 3, one bit in the authentication vector 88 is associated with each identity (i.e., card holder, a video rental store, a bank, and a grocery store). FIG. 3 shows this scenario by bits 110, 112, 114, and 116.

The participants' associated bit is initially set to one binary value, such as "0". When the smart card 24 (see, e.g., FIGS. 1 and 2) properly authenticates an identity, it resets the corresponding bit to the other binary value, such as "1". FIG. 3 shows the case in which the user and grocery store have been authenticated, as indicated by bits 110 and 116 being reset to binary value "1". The bank and video store have not been authenticated, as indicated by bits 112 and 114 being set to binary value "0".

The identity authentication table 84 (see, e.g., FIGS. 2 and 3) and authentication vector 88 (see, e.g., FIGS. 2 and 4) combine to track an arbitrary number of identities (limited only by the resources of the card). Identities do not have to be aliased or reused. Moreover, data access policies, as set forth in the authorization tables 86 (see, e.g., FIGS. 2 and 5), can expressed directly in terms of the identities and are independent of other features of the card such as data location.

Authorization Tables

Once the card has authenticated one or more identities, it may engage in a transaction if the appropriate identities supporting the desired transaction are authenticated. The smart card 24 (see, e.g., FIGS. 1 and 2) maintains authorization tables 86 (see, e.g., FIGS. 2 and 5) in the EEPROM 58 (see, e.g., FIG. 2) that set forth whether a particular transaction can be undertaken given a set of authenticated identities. The authorization tables 86 can be stored in association with particular files 82 (see, e.g., FIG. 2) so that one authorization table indicates how the transaction of the associated file can be performed.

FIG. 5 shows an authorization table 86 that is associated with a file used to facilitate renting a movie. The authorization table 86 associates movie rental transactions 120 with an authorization expression 122 represented as a Boolean function of authenticatable identities.

Suppose the movie rental file. defines two transactions: a rental transaction 124 and a return transaction 126. The rental transaction 124 facilitates renting a movie, and may involve using the card to obtain a physical copy of the movie cassette or obtaining access keys, which can be stored on the card, to enable a receiver to decrypt a video stream carrying the movie. The return transaction 126 facilitates return of the movie, either the physical return of the video cassette or verifiable destruction of the decryption key. These transactions may be performed with various video rental locations, including the video store and the grocery store.

Authorization for each transaction is a function of authenticatable identities. The rental transaction 124 is permitted if the card has authenticated both the card holder and at least one of the video rental locations (i.e., the video store or the grocery store). This authorization is represented by the following Boolean expression:

Rental=(Holder AND Video Store) OR (Holder AND Grocery Store)

Requiring two authenticatable identities ensures that the party authorizing expenditure is truly the card holder, and that the party offering the video movie is truly the video store or grocery store. Absent one of these identities, the card aborts the transaction.

The return transaction 126 does not involve authenticating the identity of the holder because the card (or video owner) need not be concerned with who returned the video, only that it is returned. For instance, a relative of the card holder may use the card to return the movie or access keys to the movie. The card only needs to know if it is returning the movie to the proper place (i.e., the video store or grocery store). Accordingly, authorization for the return transaction only requires authentication of either the video store or the grocery store, as follows:

Return=Video Store OR Grocery Store

It may take an excessive amount of time and card-resident computer program code to provide for the evaluation of an arbitrary Boolean expression on a smart card. Accordingly, one preferred technique is to transform the Boolean expression into a disjunctive normal form and to store this representation of the Boolean expression on the card. A disjunctive normal form is a Boolean expression of the form:

(A AND B AND . . . ) OR (C AND D AND . . . ) OR (E AND F AND . . . ) OR . . . OR (Y AND Z AND . . . )

It is well known that any Boolean expression can be transformed into this form and that there are ways to minimize the number of terms in the resulting expressions. Therefore, by performing some computing off the card and before the card is personalized, on card space can be saved and on card computation time minimized for the handling of arbitrary Boolean expressions.

Alternatively, a conjunctive normal form may be used as well:

(A OR B OR . . . )AND (C OR D OR . . . ) AND (E OR F OR . . . ) AND . . . AND (Y OR Z OR . . . )

The disjunctive form is slightly favored because it would be shorter on average over the kinds of Boolean expressions that are of interest in controlling access in smart cards as compared to the conjunctive form.

Authentication and Authorization Process

Figure 6:
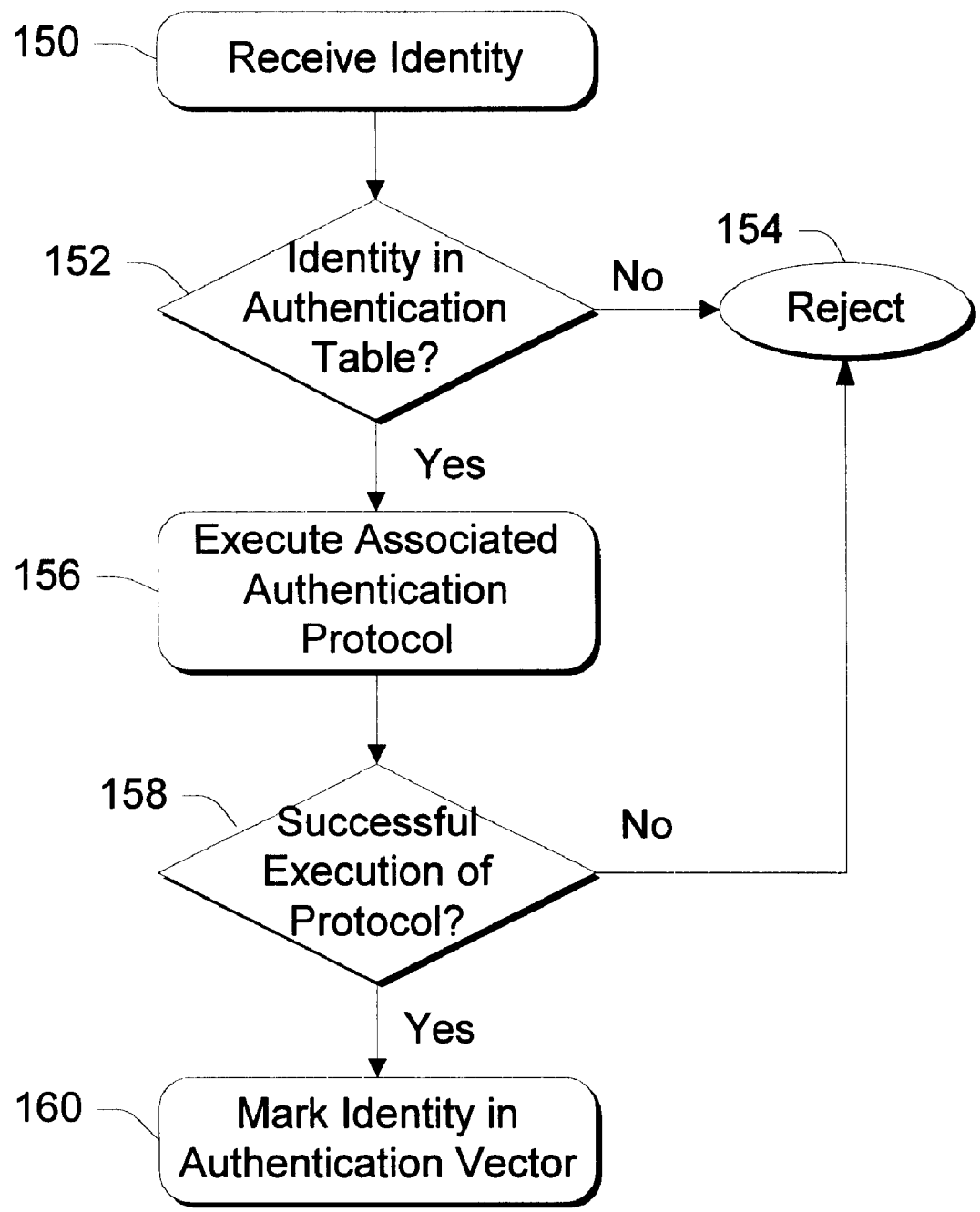
FIG. 6 is a flow diagram showing steps in a method for authentication an identity to the IC device.

FIG. 6 shows steps in a method for authenticating an identity. At step 150, the smart card 24 receives an identity (i.e., name, symbol, number, etc.). The smart card 24 determines whether the identity is listed in the identity authentication table 84 (see, e.g., FIGS. 2 and 4 and step 152 in FIG. 6). If not, the smart card 24 rejects authentication (step 154). On the other hand, if the identity is listed (i.e., the "yes" branch from step 152), the smart card performs the authentication protocol associated with the identity (step 156 in FIG. 6).

At step 158 in FIG. 6, the smart card 24 determines whether the authentication is successful. If authentication is unsuccessful, the smart card 24 rejects authentication (step 154). However, if the authentication proves successful, the smart card 24 marks the identity as authenticated by resetting its corresponding bit in the authentication vector 88 (see, e.g., FIGS. 2 and 4 and step 160 in FIG. 6).

Figure 7:
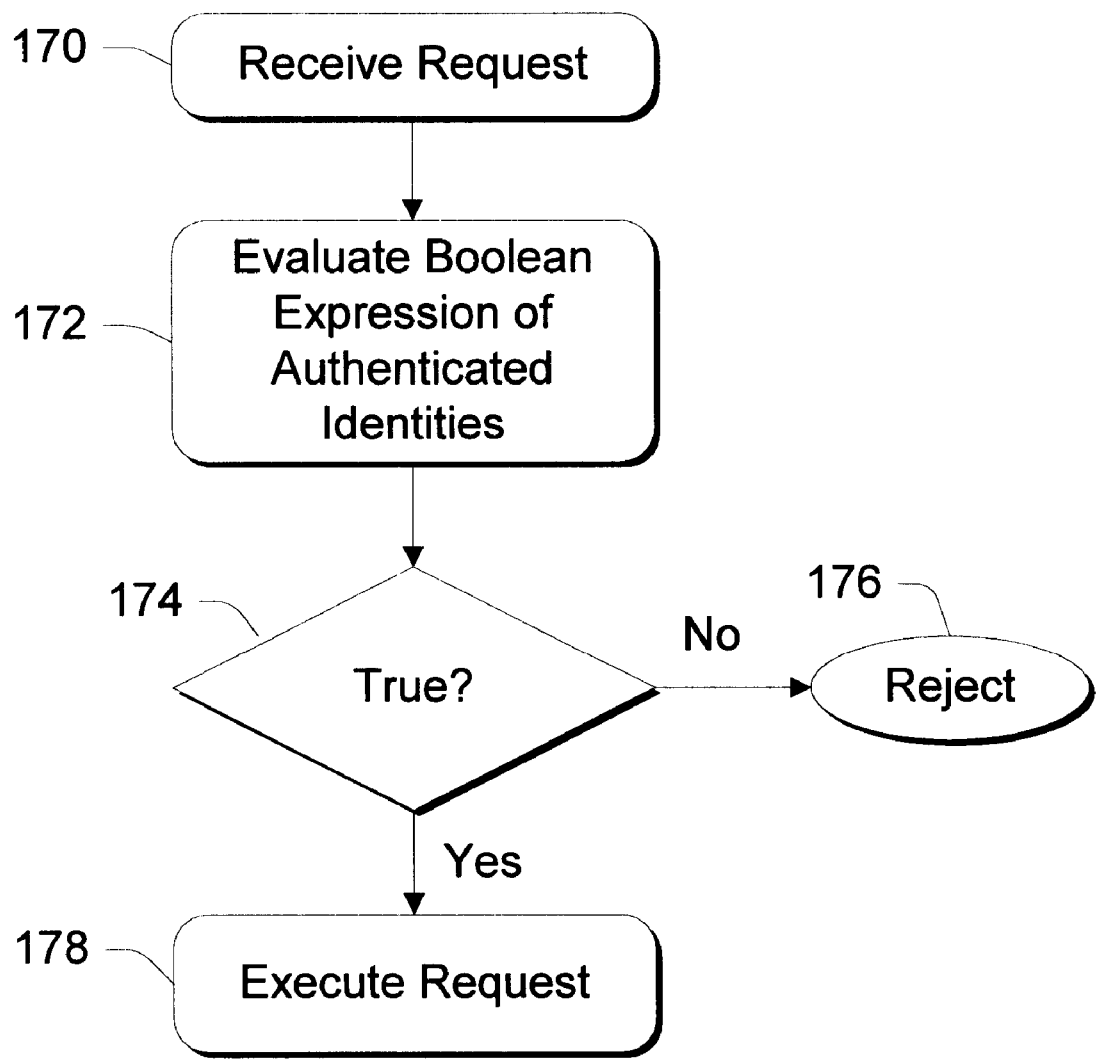
FIG. 7 is a flow diagram showing steps in a method for authorizing a particular request.

FIG. 7 shows steps in a method for authorizing a particular transaction. At step 170 in FIG. 7, the smart card receives a request for an operation, along with any identity with which the card may be involved. The card looks up the authorization table 86 (see, e.g., FIGS. 2 and 5) associated with the requested operation (e.g., the table for authorizing movie rental), and evaluates the Boolean expression assigned for that operation given the current set of authenticatable identities referenced in the authentication vector 88 (see, e.g., FIGS. 2 and 4 and step 172 in FIG. 7).

If the expression proves false (i.e., the "no" branch from step 174), the smart card 24 (see, e.g., FIGS. 1 and 2) rejects the operation (step 176 in FIG. 7). On the other hand, if the expression is true (i.e., the "yes" branch from step 174), the smart card executes the operation (step 178).

Persistent Authentication

Through the use of the identity authentication table 84 (see, e.g., FIGS. 2 and 4), the smart card 24 (see, e.g., FIGS. 1 and 2) is capable of maintaining "persistent" authentication of one or more identities. For example, the card holder may wish to authorize a particular use of the card by another person (e.g., parent to child). The card holder authenticates himself/herself to the card and gives the card to the other person, who could use it in a time/space absence of the card holder. However, the persistent authentication is limits the number of times the other person could use the card in the prescribed way.

Situations where such a card capability is useful include those in which the card holder purchases the rights to access a particular resource a fixed number of times (e.g., 100 game coupons, 10 videos, 20 gas fill ups, etc.) or with a prescribed frequency (once per day, for example). The card holder may wish to store and share these rights with others (e.g., one use or for a day), without needing to be present with the others, yet also without relinquishing ultimate control over the card's use.

As shown in FIG. 3, the identity authentication table 84 maintains a count field 96 to track a number of times a particular identity can be considered to be authenticated to the card. For each requested transaction, the card checks if the identity has been authenticated and if so, decrements the count field 96 by one. While the counter is greater than zero, the identity is regarded as being authenticated to the card and all the rights and privileges of the authenticated identity are active on the card. When the counter reaches zero, the identity is not longer deemed "authenticated" and the rights and privileges are deactivated.

In this example, the card holder 98 has a count of 5, while other identities have a count of 0. This means that the card holder is considered to be authenticated for up five uses of the card without requiring further authentication on the part of the card holder.

As an example of this persistent authentication, suppose the card holder wanted to transfer the smart card 24 (see, e.g., FIGS. 1 and 2) to another person (e.g., child, spouse, friend, etc.) to rent a video. As noted above, the expression for renting a movie requires both the card holder and a video rental place, as follows:

Rental=(Holder AND Video Store) OR (Holder AND Grocery Store)

The card holder could authorize another person to rent a movie at the video store or grocery store by authenticating himself/herself to the card and giving it to the other person. The person could use the card at the video store so long as the card was able to authenticate either the video store or the grocery store. Upon use to rent a video, the authentication count 96 for the holder is decremented from five to four.

In another example, the smart card may belong to a child, and require both authentication of the child and the parent before engaging in a transaction. In this case, the parent may decide to authenticate himself/herself to the card for a number of uses by the child. When the child engaged in an activity, like purchasing tickets to a movie, the smart card would evaluate the following expression:

Ticket=Holder AND Theater AND Parent

If the child happened to lose the card on the way to the theater, the finder couldn't use it because he/she would not know the child's PIN and therefore could not authenticate the child to the card (even though the parent was already persistently authenticated). In addition, note that the child could not attend a concert at the concert hall because the card also expects authentication of the theater before a ticket purchase can be made.

Instantaneous Authentication Command

In contrast to persistent authentication, another aspect of this invention is an authentication that lasts for only one command to the card and in fact, is combined with the command itself. Suppose, for example, that a single command to the card were "Change the home telephone number to 617-492-6076. Signed Card Holder". If the card could authenticate the card holder using the signature on the command and the card holder was authorized to update the home telephone number, the authentication and authorization steps could be combined with the execution of the single command into one transaction between the card and the outside world.

An instantaneous authentication command passes sufficient information to the card to enable authentication and instructions to perform a specified transaction. By way of example; suppose an instantaneous authentication command consists of the following fields:

| Field | Data Type |
|---|---|
| Command Header | Plain Text |
| Identity Name | Plain Text |
| Message Integrity Code | Plain Text |
| Command Data | Encrypted Text |

When this command is received, the smart card proceeds as follows:

1. Lookup the identity name in the identity authentication table 84 (see, e.g., FIGS. 2 and 4).

2. Apply the authentication protocol 92 (see, e.g., FIG. 3) to the encrypted command data.

3. Verify the message integrity code of the decrypted data with the given message integrity code.

4. If they match, authenticate the named identity; otherwise, reject the transaction.

5. Determine if the authenticated identity can perform the operation in the command header.

6. If so, perform the operation; otherwise, do not perform the operation.

7. Deauthenticate the named identity.

Secure Creation of Capability Tickets

Another aspect of this invention concerns use of an IC device to securely create and distribute capability tickets that enable an authenticated identity to gain access to an external protected resource. The resource may be any type of device, such as a computer, kiosk, vending machine, ATM, and so forth.

Figure 8:
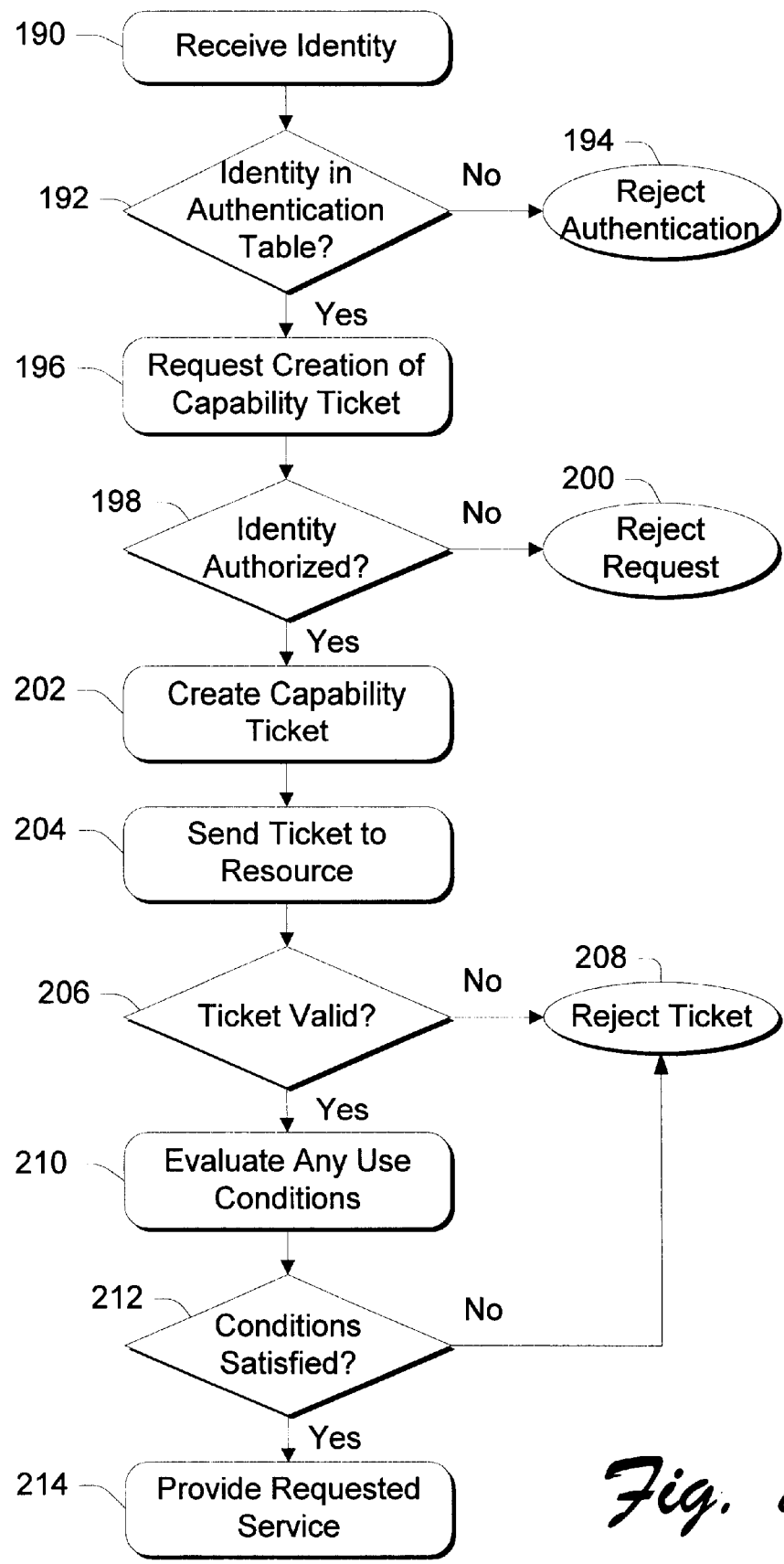
FIG. 8 is a flow diagram showing steps in a method for securely creating a capability ticket in the IC device to authorize use of an external protected resource.

FIG. 8 shows steps in a method for securely creating a capability ticket to authorize use of an external protected resource. At step 190, the smart card receives the card holder identity. The smart card then performs at step 192 the authentication process described above with respect to FIG. 6. If the authentication process proves unsuccessful, the authentication is rejected (step 194). Otherwise, if successful, the card holder can request creation of a ticket (step 196).

At step 198, the smart card determines whether the card holder is authorized to request such a ticket using the authorization tables 86 (see, e.g., FIGS. 2 and 5). If not (i.e., the "no" branch from step 198), the request is rejected (step 200). On the other hand, if the card holder is authorized (i.e., the "yes" branch from step 198), the smart card creates a capability ticket for a particular operation on a particular resource (step 202). The card holder now has a transmittable ticket that can be given to the resource to gain the requested access.

The capability ticket may also contain limitations on use generated from data stored on the card. For example, the card may include in the capability ticket the condition that the ticket be used before some specific date. Alternatively, the conditions may be that the ticket can only be used at some specific time during the day or that it is valid only if accompanied by some other capability ticket. A number of well-known techniques can be used to secure the capability ticket prepared by the card against forgery and various attacks such as replay attacks.

At step 204, the card holder presents the capability ticket to the resource. The resource determines whether the ticket is valid (step 206). If not, the resource rejects the ticket (step 208); otherwise, the resource evaluates any "use" conditions attached to the ticket (step 210). If the conditions are not satisfied (i.e., the "no" branch from step 212), the resource rejects the ticket (step 208). If the conditions are satisfied (i.e., the "yes" branch from step 212), the resource provides the requested service (step 214).

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. An integrated circuit (IC) device comprising:
   a memory;
   a processor coupled to access the memory; and
   an identity authentication table stored in the memory to hold an arbitrary number of identities associated with a single IC device user, to correlate authentication protocols with individual ones of the identities and to maintain counts for the identities, individual counts specifying a number of authenticated uses of the IC device for a corresponding identity without requiring the IC device to actually authenticate the identity for each of the authenticated uses.

2. An integrated circuit device as recited in claim 1, wherein the counts comprise decrementable counts, individual counts decrementable after each of the authenticated uses of the IC device for a corresponding identity.

3. An integrated circuit device as recited in claim 1, further comprising an authentication vector stored in the memory to track identities that are currently authenticated.

4. An integrated circuit device as recited in claim 1, further comprising an authorization table stored in the memory that defines authorization for a particular transaction as a Boolean expression of authenticatable identities.

5. An integrated circuit device as recited in claim 1, wherein the processor is configured, upon receipt of an instantaneous authentication command containing an operation and an identity, to verify the authentication of the identity, perform the operation if authenticated, and then deauthenticate the identity.

6. An integrated circuit device as recited in claim 1, wherein the processor is configured to authenticate an identity seeking to use an external protected resource, and upon authentication, to create a capability ticket for the authenticated identity to gain access to the protected resource.

7. An integrated circuit device as recited in claim 1 embodied as a smart card.

8. An integrated circuit (IC) device comprising:
   a memory;
   a processor coupled to access the memory; and
   an identity authentication table stored in the memory to hold an arbitrary number of identities associated with a single IC device user and to correlate a count with individual ones of the identities, the count specifying a number of authenticated uses of the IC device for a corresponding identity without requiring the IC device to actually authenticate the identity for each of the authenticated uses.

9. An integrated circuit device as recited in claim 8, further comprising an authentication vector stored in the memory to track identities that are currently authenticated.

10. An integrated circuit device as recited in claim 8, further comprising an authorization table stored in the memory that defines authorization for a particular transaction as a Boolean expression of authenticatable identities.

11. An integrated circuit device as recited in claim 8, wherein the processor is configured, upon receipt of an instantaneous authentication command containing an operation and an identity, to verify the authentication of the identity, perform the operation if authenticated, and then deauthenticate the identity.

12. An integrated circuit device as recited in claim 8, wherein the processor is configured to authenticate an identity seeking to use an external protected resource, and upon authentication, to create a capability ticket for the authenticated identity to gain access to the protected resource.

13. An integrated circuit device as recited in claim 8 embodied as a smart card.

14. An integrated circuit (IC) device comprising:
   a memory;
   a processor coupled to access the memory; and
   an authorization table stored in the memory, to hold a plurality of authenticatable identities associated with a single IC device user, that defines authorization for a particular transaction as a Boolean expression of at least two of the identities and maintains counts for the identities, individual counts specifying a number of authenticated uses of the IC device for a corresponding identity without requiring the IC device to actually authenticate the identity for each of the authenticated uses.

15. An integrated circuit device as recited in claim 14, further comprising an identity authentication table stored in the memory to hold an arbitrary number of identities and to correlate authentication protocols with individual ones of the identities.

16. An integrated circuit device as recited in claim 14, wherein the counts comprise decrementable counts, individual counts decrementable after each of the authenticated uses of the IC device for a corresponding identity.

17. An integrated circuit device as recited in claim 14, further comprising an authentication vector stored in the memory to track identities that are currently authenticated.

18. An integrated circuit device as recited in claim 14, wherein the processor is configured, upon receipt of an instantaneous authentication command containing an operation and an identity, to verify the authentication of the identity, perform the operation if authenticated, and then deauthenticate the identity.

19. An integrated circuit device as recited in claim 14, wherein the processor is configured to authenticate an identity seeking to use an external protected resource, and upon authentication, to create a capability ticket for the authenticated identity to gain access to the protected resource.

20. An integrated circuit device as recited in claim 14 embodied as a smart card.

21. An integrated circuit (IC) device comprising:
   a memory;
   a processor coupled to access the memory; and
   the processor being configured, to correlate an identity with one or more of an arbitrary number of identities using an identity authentication table stored in the memory to hold the arbitrary number of identities, to correlate a count with individual ones of the identities, the count specifying a number of authenticated uses of the IC device for a corresponding identity without requiring the IC device to actually authenticate the identity for each of the authenticated uses, and, upon receipt of an instantaneous authentication command containing an operation and an identity, based on the count, to verify authentication of the identity or to authenticate the identity.

22. An integrated circuit device as recited in claim 21, wherein the instantaneous authentication command comprises a command header field specifying the operation, an identity name field for the identity, a message integrity code field, and a command data field to hold data used in the operation.

23. An integrated circuit device as recited in claim 21, the processor further configured to correlate authentication protocols with individual ones of the identities.

24. An integrated circuit device as recited in claim 21, wherein the counts comprise decrementable counts, individual counts decrementable after each of the authenticated uses of the IC device for a corresponding identity.

25. An integrated circuit device as recited in claim 21, further comprising an authentication vector stored in the memory to track identities that are currently authenticated.

26. An integrated circuit device as recited in claim 21, wherein the processor is configured to authenticate an identity seeking to use an external protected resource, and upon authentication, to create a capability ticket for the authenticated identity to gain access to the protected resource.

27. An integrated circuit device as recited in claim 21 embodied as a smart card.

28. A method for authenticating an identity using an integrated circuit device, comprising the following steps:
  receiving an identity;
  determining whether the identity is listed in an identity authentication table maintained on the integrated circuit device to hold an arbitrary number of identities associated with a single integrated circuit device user;
  correlating a count with individual ones of the identities, the count specifying a number of authenticated uses of the integrated circuit device for a corresponding identity without requiring the integrated circuit device to actually authenticate the identity for each of the authenticated uses; and
  if the identity is listed, based on the count, verifying authentication of the identity or authenticating the identity using an authentication protocol correlated with the identity in the identity authentication table.

29. A method as recited in claim 28, further comprising the step of rejecting the identity if the identity is not listed in the identity authentication table.

30. A method as recited in claim 28, further comprising the step of changing a bit value in an authentication vector to reflect that the identity is authenticated.

31. A method as recited in claim 28, further comprising the step of decrementing a count associated with the identity in the identity authentication table upon authentication of the identity.

32. A method as recited in claim 28, further comprising the following steps:
  repeating the determining and authenticating steps to authenticate multiple identities; and
  performing a transaction as a Boolean expression of the multiple authenticated identities.

33. A method for authenticating an identity using an integrated circuit device, comprising the following steps:
  correlating identities with a count in an identity authentication table maintained on the integrated circuit device to hold an arbitrary number of identities associated with a single integrated circuit device user, wherein the count specifies a number of authenticated uses for a corresponding identity without requiring actual authentication of the identity for each of the authenticated uses;
  receiving an identity; and
  upon each of the authenticated uses, decrementing the count associated with the identity in the identity authentication table.

34. A method as recited in claim 33, further comprising the following steps:
  requiring actual authentication of the identity if the count is at a predetermined value; and
  foregoing actual authentication of the identity if the count is not at the predetermined value.

35. A method for authorizing a transaction, comprising the following steps:
  tracking multiple authenticated identities
  associating an authorization table with a particular transaction, the authorization table holding an arbitrary number of identities associated with a single user and defining a Boolean expression of the one or more authenticated identities;
  performing the particular transaction in an event that the Boolean expression in the authorization table is satisfied; and
  decrementing a count, the count specifying a number of authenticated uses for a corresponding identity without requiring actual authentication of the identity for each of the authenticated uses.

36. A method for authorizing a transaction using an integrated circuit device holding an arbitrary number of identities associated with a single integrated circuit device user, comprising the following steps:
  receiving an instantaneous authentication command containing an operation and an identity;
  correlating the identity with a count, the count specifying a number of authenticated uses for a corresponding identity without requiring actual authentication of the identity for each of the authenticated uses;
  based on the count, verifying authentication of the identity or authenticating the identity; and
  performing the operation if the identity is verified or authenticated.

37. A method as recited in claim 36, wherein the verifying or authenticating step comprises the following steps:
  determining whether the identity is listed in an identity authentication table maintained on the integrated circuit device for holding the arbitrary number of identities; and
  if the identity is listed, based on the count, verifying authentication of the identity or authenticating the identity using an authentication protocol correlated with the identity in the identity authentication table.

38. A storage medium embodied in an integrated circuit device, comprising:
  an identity authentication table to hold multiple identities associated with a single integrated circuit device user and to correlate the identities with associated authentication protocols and a count, the count specifying a number of authenticated uses for a corresponding identity without requiring actual authentication of the identity for each of the authenticated uses; and
  code means for performing the following steps:
    (a) receiving an identity;
    (b) determining whether the identity is listed in the identity authentication table; and
    (c) if the identity is listed, based on the count, verifying authentication of the identity or authenticating the identity using the authentication protocol correlated with the identity in the identity authentication table.

39. A storage medium embodied in an integrated circuit device, comprising:
  an identity authentication table to hold multiple identities associated with a single integrated circuit device user and to correlate the identities with associated authentication protocols and a count, the count specifying a number of authenticated uses for a corresponding identity without requiring actual authentication of the identity for each of the authenticated uses; and code means for performing the following steps:
(a) receiving an instantaneous authentication command containing an operation and an identity;
(b) based on the count, verifying authentication of the identity or authenticating the identity using the authentication protocol correlated with the identity in the identity authentication table; and
(c) performing the operation if the identity is authenticated.

40. A storage medium embodied in an integrated circuit device, comprising:
an identity authentication table to hold multiple identities associated with a single integrated circuit device user;
an authentication vector to track the identities in the identity authentication table that are currently authenticated;
a count, the count specifying a number of authenticated uses for a corresponding identity without requiring actual authentication of the identity for each of the authenticated uses;
an authorization table stored in the storage medium that defines authorization for a particular transaction as a Boolean expression of the identities listed in the identity authentication table; and
code means for performing the following steps:
(a) receiving a request for the particular transaction;
(b) evaluating, from the counts and the authorization table, what identities need to be authenticated to satisfy the Boolean expression and gain authorization to perform the particular transaction; and
(c) determining, from the authentication vector, whether the identities needed to satisfy the Boolean expression are currently authenticated and if so, authorizing the particular transaction.

41. An integrated circuit (IC) device comprising:
a memory;
a processor coupled to access the memory; and
an identity authentication table stored in the memory to hold an arbitrary number of identities associated with a single IC device user, to maintain a count for each of the identities wherein the count specifies a number of authenticated uses for each identity without requiring actual authentication of the identity for each of the authenticated uses, to correlate authentication protocols with individual ones of the identities, to hold data required by the authentication protocols, and to correlate the data required by the authentication protocols with individual ones of the identities.

42. An integrated circuit device as recited in claim 41, wherein the counts comprise decrementable counts, individual counts decrementable after each of the authenticated uses of the IC device for a corresponding identity.

43. An integrated circuit device as recited in claim 41, further comprising an authentication vector stored in the memory to track identities that are currently authenticated.

44. An integrated circuit device as recited in claim 41, further comprising an authorization table stored in the memory that defines authorization for a particular transaction as a Boolean expression of authenticatable identities.

45. An integrated circuit device as recited in claim 41, wherein the processor is configured, upon receipt of an instantaneous authentication command containing an operation and an identity, to verify the authentication of the identity, perform the operation if authenticated, and then deauthenticate the identity.

46. An integrated circuit device as recited in claim 41, wherein the processor is configured to authenticate an identity seeking to use an external protected resource, and upon authentication, to create a capability ticket for the authenticated identity to gain access to the protected resource.

47. An integrated circuit device as recited in claim 41 embodied as a smart card.

48. A method for authenticating an identity using an integrated circuit device, comprising the following steps:
receiving an identity;
determining whether the identity is listed in an identity authentication table maintained on the integrated circuit device for holding identities associated with a single integrated circuit device user;
if the identity is listed, correlating the identity with a count, the count specifying a number of authenticated uses for the identity without requiring actual authentication of the identity for each of the authenticated uses; and
if the identity is listed, based on the count, verifying authentication of the identity or authenticating the identity using an authentication protocol and data required by the authentication protocol, the authentication protocol and the data correlated with the identity in the identity authentication table.

49. A method as recited in claim 48, further comprising the step of rejecting the identity if the identity is not listed in the identity authentication table.

50. A method as recited in claim 48, further comprising the step of changing a bit value in an authentication vector to reflect that the identity is authenticated.

51. A method as recited in claim 48, further comprising the step of decrementing a count associated with the identity in the identity authentication table upon verifying authentication of the identity.

52. A method as recited in claim 48, further comprising the following steps:
repeating the determining, correlating and verifying or authenticating steps to authenticate multiple identities; and
performing a transaction as a Boolean expression of the multiple authenticated identities.

53. A storage medium embodied in an integrated circuit device, comprising:
an identity authentication table to hold multiple identities associated with a single integrated circuit device user, to correlate the identities with associated authentication protocols, to hold data required by the authentication protocols, and to correlate the identities with the data;
a count, the count specifying a number of authenticated uses for a corresponding identity without requiring actual authentication of the identity for each of the authenticated uses; and
code means for performing the following steps:
(a) receiving an identity;
(b) determining whether the identity is listed in the identity authentication table;
(c) if the identity is listed, correlating the identity with a count; and
(d) if the identity is listed, based on the count, verifying authentication of the identity or authenticating the identity using the authentication protocol and data correlated with the identity in the identity authentication table.

* * * * *

UNITED STATES PATENT AND TRADEMARK OFFICE
CERTIFICATE OF CORRECTION

PATENT NO.    : 6,567,915 B1
DATED         : May 20, 2003
INVENTOR(S)   : Guthery It is certified that error appears in the above-identified patent and that said Letters Patent is hereby corrected as shown below:

Column 7,
Line 5, replace "avdoid" with -- avoid --.

Signed and Sealed this

Fifteenth Day of July, 2003

JAMES E. ROGAN
*Director of the United States Patent and Trademark Office*